Aug. 29, 1961    J. P. RUTH    2,998,308
GAS TREATING APPARATUS
Filed March 24, 1958    2 Sheets-Sheet 1

INVENTOR.
Joseph P. Ruth,
BY
ATTORNEY

United States Patent Office
2,998,308
Patented Aug. 29, 1961

2,998,308
GAS TREATING APPARATUS
Joseph P. Ruth, 1325 Glenarm Place, Denver 4, Colo.
Filed Mar. 24, 1958, Ser. No. 723,232
4 Claims. (Cl. 23—284)

As a development from and an advantageous extension of the method disclosed in my United States Patent No. 2,611,680, dated September 23, 1952, appropriate for adaptation to and operative correlation with and to enhance the performance of apparatus of the general type described in my Patents No. 2,677,601, dated May 4, 1954, No. 2,678,261, dated May 11, 1954, No. 2,785,-962, dated March 19, 1957, and pending applications for patent Serial No. 488,099, filed February 14, 1955, now Patent No. 2,877,098 and Serial No. 634,700, filed January 17, 1957, now Patent No. 2,876,080, this invention relates to the ameliorative conditioning of noxious gases and vapors, of which the exhaust gas output from diesel-type internal combustion engines is typical, for discharge to atmosphere free from properties objectionable or inimical to humans, and has as an object to provide novel and improved techniques coactively complemental to the method of the patent first above noted to enhance the effectiveness thereof.

A further object of the invention is to provide a novel and improved combination with a known ameliorative gas conditioning method of correlative techniques effective to facilitate and to enlarge the capability of the former.

A further object of the invention is to provide a novel and improved combination with a known ameliorative gas conditioning method of complemental techniques promotive of desired gas constituent reaction to the influence of the associated method.

A further object of the invention is to provide a novel and improved combination with a known ameliorative gas conditioning method of synchronously-correlated, supplementary steps operable to adapt constituents of a gas flow subject thereto for enhanced desired reaction to the influence of the associated method.

A further object of the invention is to provide novel and improved apparatus for the ameliorative conditioning of gases and vapors.

A further object of the invention is to provide a novel and improved combination with gas conditioning apparatus of known type of adjunctive means promotive of enhanced apparatus performance.

A further object of the invention is to provide novel and improved means for the continuous, electrochemical, ameliorative modification of noxious gases and vapors.

A further object of the invention is to provide a novel and improved ameliorative treatment for noxious gases and vapors that is continuously operable to efficiently cleanse a flow of gas or vapor subject thereto, that is susceptible of practical realization through known and readily-available facilities and instrumentalities, that is economical of application and operation, and that is expedient of adaptation to an extensive range of particular uses.

With the foregoing and other objects in view, my invention resides in the nature, correlation, and sequential relation of complementary processing phases and method steps, and in the organization of means for effectuating the same, as hereinafter set forth, pointed out in my claims, and typified by the views of the accompanying drawings, in which—

Figure 1:
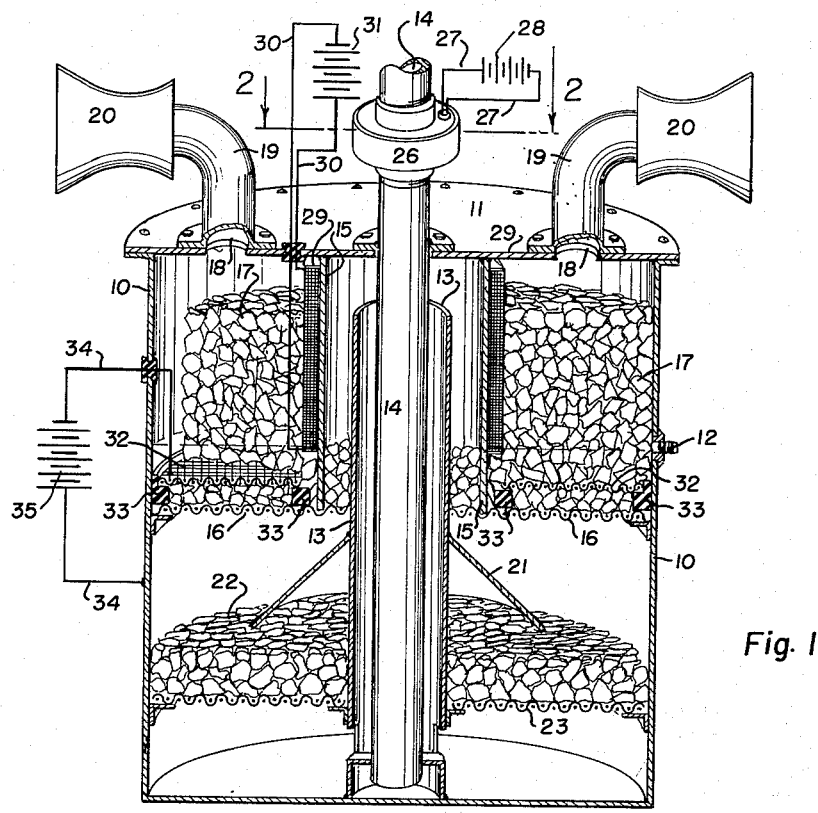
FIGURE 1 is a vertical section in slight perspective axially through a gas conditioner unit of the general type disclosed in my patents and patent applications above noted as supplemented and organized within the contemplations of the instant invention to effect the purposes and realize the advantages thereof.

Representative of apparatus shown and described in my earlier patents and patent applications, above noted, as appropriate for practice of the method according to my Patent No. 2,611,680, there is shown in FIGURE 1 an upright, expediently-cylindrical housing 10, closed save as hereinafter specified, as by means of a removable cover plate 11, adapted to confine a charge of water in its lower portion preferably rising past the midheight of the housing to a level determinable by means of a removable outlet plug 12. A conduit 13 fixed centrally within the housing 10 upstands through and beyond the water charge in communication with the latter adjacent its base to terminate in an open upper and spacedly subjacent the cover plate 11, and a gas flow input line 14 is sealed through said plate 11 to extend coaxially of and within the conduit 13 to an open lower end spacedly adjacent the floor of the housing and preferably below the zone of water charge inflow to the conduit. The line 14 is provided in an outside diameter considerably less than the inside diameter of the conduit 13, whereby to leave an annular flow space therebetween, so that input of gas or vapor under pressure through the line 14 acts with a charge of water present in the housing to generate a gas-water mixture and to elevate the same to delivery through the open end of the conduit within the upper portion of the housing above the water charge. Output from the upper end of the conduit 13 is received within a hood 15 closing at one end against the plate 11 and depending thence concentrically with and spacedly about the conduit 13 to an open lower end within the water charge, and a reticulate or foraminous baffle 16 is mounted transversely of the housing 10 across the open lower end of said hood 15 and about the conduit 13 in supporting relation with a charge 17 of diffusing material, such as broken limestone, intruding within said lower end of the hood and exteriorly surrounding the same to largely fill the housing upper portion above the baffle. Outlets from the upper portion of the housing 10, represented as openings 18 through the cover plate 11, desirably coact with associated flow lines 19 adapted to deliver to and through terminal attenuators or diffusers 20 of conventional Venturi type to provide unobstructed communication between the housing upper portion and atmosphere, and a conical deflector 21 diverging outwardly and downwardly within the water charge from about the conduit 13 above a submerged diffusing bed 22 of broken limestone, or the substantial equivalent, supported on a reticulate or foraminous baffle 23 traversing the housing 10 above the zone of water charge inflow to the conduit completes structural organization of a unit such as is disclosed in my earlier patents as appropriate for practice of the method of gas and vapor treatment according to my Patent No. 2,611,680.

With a water charge filling the lower portion of the housing 10 to substantially the level indicated by the plug 12, and diffusing beds 17 and 22 of broken limestone present in supported relation with the baffles 16 and 23, substantially as shown in FIGURE 1, input of the gas or vapor to be treated through the line 14 under moderate pressure, such as that of exhaust gas discharge from an internal combustion engine, acts to generate a mixture of the incoming gas with water inflow to the base of the conduit 13 and to circulate such mixture upwardly of the space between the line 14 and conduit 13 to delivery from the upper end of the latter to the interior of the hood 15 wherein some expansion of the entrained gases is accommodated and wherethrough the constituents of the combined flow are directed downwardly and exteriorly about the conduit 13 to and through the diffusing material at the lower end of the hood with displacement of water charge standing above the said lower end of the hood effective to permit gas escape about the hood lower margin and upwardly through the bed 17 as it separates from the water of the combined flow which is thus returned to and for recirculation with the principal body of the water charge. The gas-water mixture generated and delivered to the hood 15 as above described is acidic and hence reactive with the limestone material, substantially insoluble in water, forming the beds 17 and 22, whence results a chemical conversion of the amenable gas constituents to forms soluble in water as the wetted gases, gas-water mixtures, and water charge portions circulate and recirculate through said beds in washing and wetting coaction with the components thereof. Applicable, as herein briefly set forth, for practice of the ameliorative gas conditioning method characterizing Patent No. 2,611,680, the typical apparatus shown and described operates to cool, wash, scrub, and modify gases and vapors constrained or induced to circulate therethrough from the line 14 and to the outlets 18, and more especially operates on gases and vapors evidencing acidity when mixed or combined with water to neutralize such acidity with entrapment of the acidity-promoting constituents as solubles in the water charge, to separate and impound insolubles entrained with the gas input, to renovate circulated portions of the water charge for reuse, to maintain in effective surface exposure the components of the beds 17 and 22, and to release to atmosphere a cooled and conditioned gas or vapor free from noxious and inimical factors.

All of the foregoing but recapitulates the techniques and organizations disclosed in my patents and patent applications hereinabove identified, and is herein elaborated merely to facilitate explanation and understanding of, and as environment appropriate to give practical effect to, the novelties and improvements of the instant invention.

The authoritative and accepted principles of electrochemistry quite definitely establish that the chemical behavior and chemical activity of substances, compounds, and elements are to an important degree proportioned to and variable with the electron charge, or ionization, thereof, whereby regulation of such charge may be availed of to stimulate, and in some instances to initiate, desired reactions. Gases and vapors are notably amenable to ionization control for regulation and variation of their chemical behavior, and it is to a practical adaptation of such principles for advantageous improvement in the treatment of gases and vapors by the method and through the apparatus heretofore described that the instant invention is directed.

Figure 2:
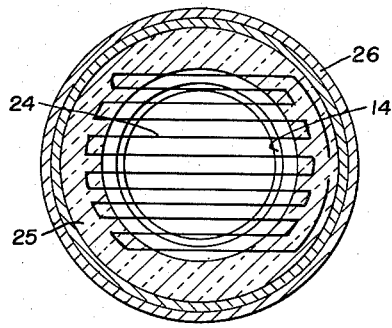
FIGURE 2 is a cross section, on a relatively enlarged scale, taken substantially on the indicated line 2—2 of FIGURE 1.

It being recognized that the water-wettability and the water-solubility of components and constituents of gases and vapors are affected by the ionic properties of a gas or vapor flow exposed to contact with water, a feature of the instant invention is the positive control and regulation of the ionic properties of the gas or vapor input to be treated by the method and through the apparatus above described in a manner and to an extent effective to promote desired complete wetting of the constituents characterizing the input flow and maximum absorption thereof by the processing water whereto they are introduced. Without regard to theoretical and technical principles peculiar to the ionization of gases, which are not at all essential to understanding and practice of the improvements herein elaborated, it has been determined that efficiency of the method and apparatus hereinabove typified is materially enhanced when the input of gas or vapor to be treated is caused to traverse an electronic field operable, as is well known, to ionize the flow subject thereto. A practical arrangement expedient to maintain such an electronic field in the path of gas and vapor input to the typical apparatus illustrated and above described is represented as a grid 24, FIGURE 2, formed from a continuous length of an electrical conductor, such as bare metallic wire, disposed to repetitiously traverse the central opening of an annular insulator 25 mounted in a coupling 26 connectible in and as a portion of the input line 14 of the apparatus unit, preferably exteriorly thereof, whereby to position said grid transversely of and across the path of input flow through said line. As indicated, the open central area of the insulator 25 registers coaxially with the associated line 14 and is desirably somewhat larger than the flow area of the line to obviate any restriction of flow through the line occasioned by the presence of the grid 24. Ends of the conductor forming the grid 24 are connected, as by means of leads 27, to and in circuit with a source or supply of electrical energy, such as a battery 28, so that whenever the circuit including the grid 24 and battery 28 is complete there is a flow of current through the grid and a consequent electronic field across the flow path through the line 14 effective to ionize the constituents of the flow therethrough.

The ionization of the gas input flow prior to contact with the water charge of the apparatus accomplished by the grid 24 is advantageously supplemented subsequent to initial generation of gas-water mixtures through the provision of an electromagnetic field across the path of mixture circulation, and it is practical to establish such a field within the hood 15 through the agency of a coil 29 exteriorly about the major upper portion of said hood in circuit through leads 30 with a source or supply of electrical energy, such as a battery 31, whereby completion of the powered circuit through the coil 29 and leads 30 acts to maintain a field of magnetic flux interiorly of the hood and across the path of gas, water, and gas-water mixture circulation therethrough. Manifestly, all flow through the hood 15 is subjected to the influence of the field generated by the coil 29 for consequent reaction thereto in a manner and to a degree found to be effective in stimulating desired intimate gas-water contacts and combinations and in promoting desired coaction of the resulting fluids with the limestone components of the diffusing beds wherethrough they are constrained to circulate.

Ionization control of the circulation in the manner and by the typical means above set forth is but briefly effective as the consequent characteristic relation of electrons persists only until modified by the interactions and reactions incident to progress of the circulatory cycle, and since a controlled ionized condition of the fluids contacting the limestone components of the diffusing bed 17 materially enhances the effectiveness of such contact for realization of intended purposes, it is desirable and entirely feasible to establish yet another electronic field disposed for traverse by and ionization of the circulated fluids contacting said bed. Maintenance of an ionizing field in the path of fluid circulation within and through the bed 17 is the expedient function of an electrically-conductive grid 32, of any suitable pervious construction, spanning within the lower portion of the bed 17 between the hood 15 and housing 10 in a slight spacing from and above the baffle 16 determined by supporting members 33 of dielectric material appropriately engaged with and to insulate said grid from the housing and hood. A circuit represented by leads 34 connects the grid 32 with a source or supply of electrical energy, such as the battery 35, and is completed to ground connection with the housing 10, or other appropriate element of the apparatus, to maintain an ionizing charge on said grid by virtue of current flow from the battery 35 through a path conductively closed by the fluids of the mixtures circulating between the grid and adjacent metallic elements of the apparatus. With the grid 32, or an equivalent, disposed and charged as shown and described, the solutions circulated through lower portions of the bed 17 and the gases and vapors uprising through said bed are subjected to the ionizing influence of the charged grid in a manner and to a degree facilitating and enhancing desired ameliorative coaction thereof with the limestone components washed thereby and with felicitous cleansing effect on such surfaces.

Obviously, any one, or any desired combination, of the three electrically induced fields shown and above discussed may be utilized in and to supplement the practice of the gas and vapor conditioning treatment disclosed by my Patent No. 2,611,680 in any arrangement and structural organization substantially equivalent to the typical embodiment illustrated and described, but considerations of practicality and efficiency favor the use of the three stages in the sequential correlation with fluid circulation hereinabove elaborated.

Figure 3:
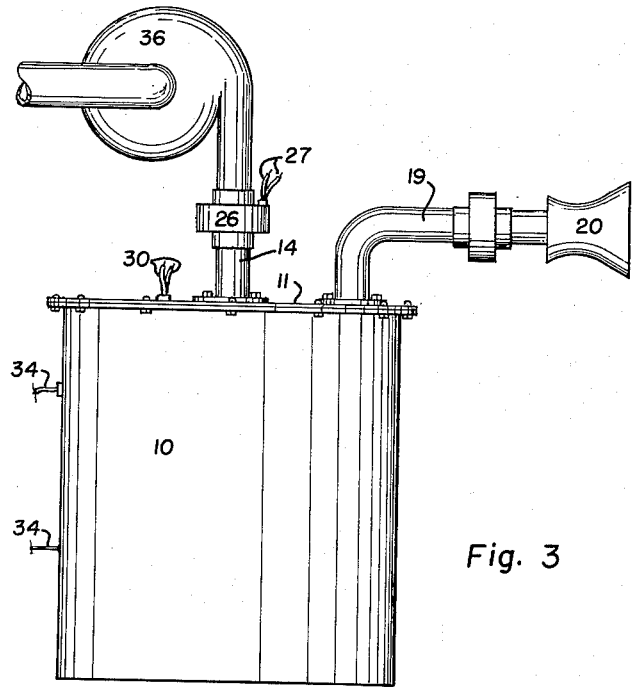
FIGURE 3 is an elevation, on a relatively reduced scale, of the unit represented by FIGURE 1 as adapted within the contemplations of the invention for treatment of an initially unpressurized flow or accumulation of gas or vapor.
Figure 4:
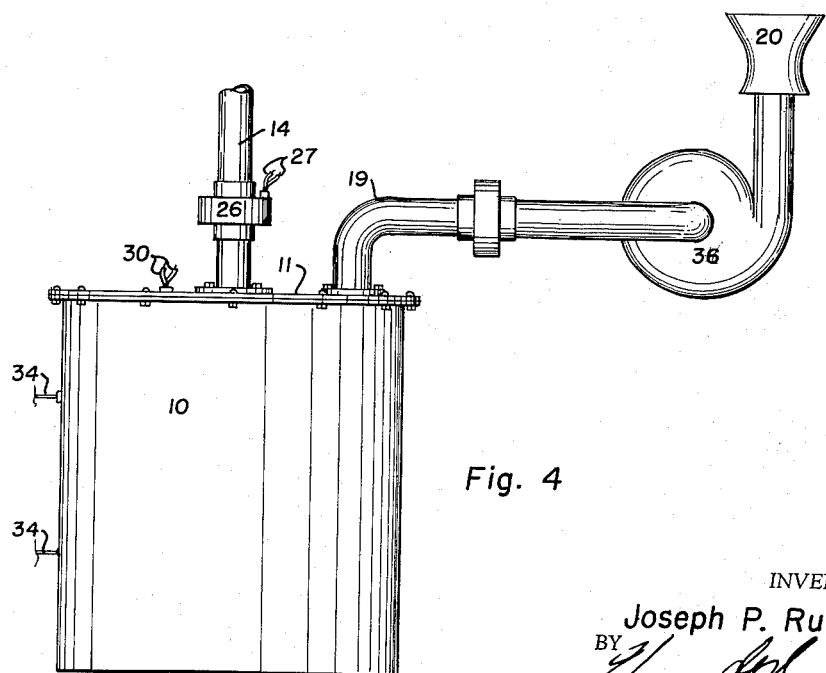
FIGURE 4 is an elevation of the general organization according to FIGURE 3 as alternatively adapted to attain a like result.

While the improvements of the instant invention have been exemplified in connection with and as applied to the treatment of gases and vapors available for input to and through the line 14 under flow pressures deriving from the conditions of their production sufficient to effect circulation thereof through the typical apparatus and steps of the method treatment, it is manifest that the method is applicable to treatment of unpressurized gases and vapors amenable thereto through simple adaptation of the apparatus in the manner indicated by FIGURES 3 and 4. Hazardous concentrations of toxic gases or vapors in the circumambient atmosphere, or any other unpressurized supply of gases or vapors amenable to amelioration by the method herein discussed, may be conveniently introduced to and circulated through the conditioning unit represented by the housing 10 through the provision of any appropriate type and size of pump, conventionally indicated at 36, operatively associated with the unit to effect pressure flow of the gas or vapor therethrough in accordance with the cycle above set forth. As represented by FIGURE 3, the outlet of the pump 36 may be connected with and to deliver directly to the end of the input line 14 exterior to the housing 10, in which case the pump functions in an obvious manner to draw gas and vapor, from any desired source or supply, through its inlet and to deliver the same to and through the line 14 under regulable pressure suitable to effect transit thereof through the apparatus to discharge of the treated products from a typical outflow line 19 delivering to atmosphere, and the alternative arrangement according to FIGURE 4 merely applies the pump 36 for suction effect on and through an outlet line 19 which operates in a fully apparent manner to induce intake of gas and vapor to be treated through the line 14 open to or connecting with the source or supply to be treated.

Typical of the practical and advantageous use of the improvements characterizing the instant invention organized as illustrated and described, it was found that when exhaust gas from a diesel-type internal combustion engine was introduced by means of the line 14 of the apparatus represented by FIGURE 1 to pass through the grid 24 supplied with a current of 110 volts at 200 amperes, entrainment of carbon particles in the discharge from the apparatus was minimized, if not wholly eliminated, with consequent alteration of the previous smoky discharge to an appearance of steam and corresponding darkening of the apparatus solution to the characteristic black hue typical of carbon, thus demonstrating the efficacy of the ionizing effect produced by the grid 24 in stimulating, enhancing, and facilitating ameliorative conditioning of the gases so treated. The merit of the electromagnetic field introduced by the coil 29 is established by a definite lowering of the acidity characterizing the circulating solution when and as such circulation is exposed to the field. With the coil 29 served by a current of 110 volts at 20 amperes, the pH of the solution is significantly elevated above that obtaining when the coil is not energized; it having been determined that when the engine gas above noted is passed through water alone in the absence of limestone the resulting solution attains a pH value of 2.7; that when said gas is similarly circulated through water in the presence of limestone, the pH value is raised to 3.7; and that when the gas is circulated with water through the energized coil 29 in the presence of limestone within and by means of the typical illustrated apparatus, the pH value is raised to 4.7. Manifestly, reduction in the acidity factor of the working solution is consequential to attainment of required results in that it maintains the solution in condition to more perfectly and more readily combine with and to wet the constituents of the gas thereto exposed. A principal functional advantage of the grid 32 appears to be a depolarizing reaction with the associated limestone bed which inhibits coating of the limestone fragments and consequent exclusion of the coated surfaces from neutralizing reaction with the acid constituents of the solution, it having been established that when the grid 32 is served by a current of 36 volts at approximately 6 amperes, the surfaces of the limestone fragments forming the bed 17 remain bright and clean, free from any persistent coating or deposit, and hence in condition for effective performance of their intended function.

Since changes, variations, and modifications in the form, construction, and arrangement of the elements shown and described, and in the precise character and correlation of the method steps set forth, may be had without departing from the spirit of my invention, I wish to be understood as being limited solely by the scope of the appended claims, rather than by any details of the illustrative showing and foregoing description.

I claim as my invention:

1. In gas-treating apparatus having a housing adapted to confine a charge of water, a gas input line disposed to deliver interiorly of the housing and within the water charge thereof, a passage for the intermixing and direction of combined gas and water flow generated in reaction to gas input, and a bed of broken limestone in the path of outflow from said passage, the improvement which comprises means for maintaining a flow-ionizing electronic field across the flow path through said input line and separate means for maintaining an electromagnetic field across the flow path through said passage.

2. In gas-treating apparatus having a housing adapted to confine a charge of water, a gas input line disposed to deliver interiorly of the housing and within the water charge thereof, a passage for the intermixing and direction of combined gas and water flow generated in reaction to gas input, and a bed of broken limestone in the path of outflow from said passage, the improvement which comprises means for maintaining a flow-ionizing electronic field across the flow path through said input line, separate means for maintaining an electromagnetic field across the flow path through said passage, and other separate means for maintaining a flow-ionizing electronic field across the flow path through said bed.

3. In gas-treating apparatus having a housing adapted to confine a charge of water, a gas input line disposed to deliver interiorly of the housing and within the water charge thereof, a passage for the intermixing and direction of combined gas and water flow generated in reaction to gas input, and a bed of broken limestone in the path of outflow from said passage, the improvement which comprises a conductive grid in circuit with a source of electrical energy insulated from and across the flow path through said input line and a conductive coil in circuit with a source of electrical energy insulated from and exteriorly surrounding said passage.

4. In gas-treating apparatus having a housing adapted to confine a charge of water, a gas input line disposed to deliver interiorly of the housing and within the water charge thereof, a passage for the intermixing and direction of combined gas and water flow generated in reaction to gas input, and a bed of broken limestone in the path of outflow from said passage, the improvement which comprises a conductive grid in circuit with a source of electrical energy insulated from and across the flow path through said input line, a conductive coil in circuit with a source of electrical energy insulated from and exteriorly surrounding said passage, and another conductive grid in circuit with a source of electrical energy across the flow path through said bed.

References Cited in the file of this patent

UNITED STATES PATENTS

| | | |
|---|---|---|
| 1,358,031 | Smith | Nov. 9, 1920 |
| 2,611,680 | Ruth | Sept. 23, 1952 |
| 2,768,881 | Ruth | Oct. 30, 1956 |

FOREIGN PATENTS

| | | |
|---|---|---|
| 686,779 | Great Britain | Jan. 28, 1953 |